United States Patent [19]

Gonzalez et al.

[11] Patent Number: 4,829,142

[45] Date of Patent: May 9, 1989

[54] AMINOFATTY ACID AMIDES FROM THE REACTION OF AN EPOXIDIZED FATTY ACID ESTER WITH A POLYFUNCTIONAL AMINE, AND USE AS A CROSSLINKING AGENT

[75] Inventors: René A. A. Gonzalez; Manfred Budnowski, both of Duesseldorf; Julius Herold, Monheim; Horst Rutzen, Langenfeld; Eberhard Schneider, Monheim; Hans-Guenter Seltmann, Duesseldorf, all of Fed. Rep. of Germany

[73] Assignee: Henkel Kommanditgesellschaft auf Aktien, Duesseldorf, Fed. Rep. of Germany

[21] Appl. No.: 86,469

[22] Filed: Aug. 18, 1987

[30] Foreign Application Priority Data

Aug. 18, 1986 [DE] Fed. Rep. of Germany ....... 3627924

[51] Int. Cl.$^4$ .............................................. C08G 59/44
[52] U.S. Cl. .................................. 528/111; 528/103.5
[58] Field of Search .......................................... 528/111

[56] References Cited

U.S. PATENT DOCUMENTS 3,138,566  6/1964  Arnold ............................ 528/103.5
3,326,946  6/1967  Zuppinger et al. ................ 528/111

Primary Examiner—Earl Nielsen
Assistant Examiner—Frederick F. Krass
Attorney, Agent, or Firm—Ernest G. Szoke; Wayne C. Jaeschke; Real J. Grandmaison

[57] ABSTRACT

Aminohydroxy fatty acid amides obtained by condensation from epoxidized fatty acid alkyl esters and polyfunctional aliphatic oligoamines may be employed as crosslinking agents for polyfunctional epoxide compounds used as adhesives and/or coating compositions.

The preferred crosslinking agent represents the reaction product of
(1) epoxidized stearic acid methyl ester and
(2) ethylene diamine or diethylene triamine, and has the following formula:

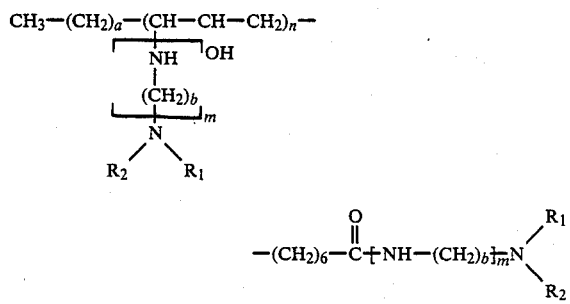

12 Claims, No Drawings

AMINOFATTY ACID AMIDES FROM THE REACTION OF AN EPOXIDIZED FATTY ACID ESTER WITH A POLYFUNCTIONAL AMINE, AND USE AS A CROSSLINKING AGENT

BACKGROUND OF THE INVENTION

1. Field of the Invention

This invention relates to the use of aminohydroxy fatty acid amides in which amino and hydroxy groups are vicinally arranged on the alkyl chain as crosslinking agents for epoxide compounds, more especially, for reactive adhesives based on polyfunctional epoxide compounds.

2. Discussion of Related Art

Aliphatic amines, particularly substituted aliphatic polyamines, as typical crosslinking agents for polyfunctional epoxide compounds have long been the agents of choice. Particular importance among them is attributed to the polyamino amides of fatty acids the condensation of which may be conducted in such a way that, in addition to the constituents of the dimerized fatty acid, imadazoline rings are also formed in the molecule. The macromolecule formed from the polyfunctional epoxide compound and the amine ponents present in the molecule.

An object of the present invention is to provide another group of substituted polyamides which contain other functional groups in the molecule and also have a favorable effect upon the hardening or the crosslinking reaction of the epoxide compound.

DESCRIPTION OF THE INVENTION

Other than in the operating examples, or where otherwise indicated, all numbers expressing quantities of ingredients or reaction conditions used herein are to be understood as modified in all instances by the term "about".

The present invention relates to the use of an aminohydroxy fatty acid amide, obtained by condensation from an epoxidized fatty acid alkyl ester and a polyfunctional aliphatic oligomer, as a crosslinking agent for a polyfunctional epoxide compound. More particularly, the invention relates to the process of employing an aminohydroxy fatty acid amide corresponding to the following formula

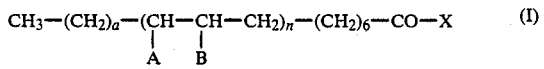

wherein $n=1$ and $a=7$, or $n=2$ and $a=4$, or $n=3$ and $a=1$, and one of the substituents A and B represents a hydroxyl group while the other substituent B or A and the substituent X represent a radical corresponding to the following formula

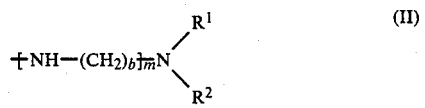

wherein b is an integer of from 2 to 6, $m=1$ or 2, and $R^1$ and $R^2$ independently of one another represent hydrogen or a $C_1$-$C_{12}$ alkyl radical, as a crosslinking agent for a polyfunctional epoxide compound.

It has been found to be advantageous to use an aminohydroxy stearic acid amide corresponding to the above formula as a crosslinking agent (hardener) for an adhesive and/or a coating composition based on an epoxy resin. In this regard, it is preferred to use the aminohydroxy stearic acid amide in such a quantity that there are about 90 to 150 amine equivalents to 100 epoxide equivalents. The aminohydroxy fatty acid amides used are compounds known per se. They may be produced by known methods, and the particulars of their synthesis are provided in the following.

The compounds corresponding to formula I are preferably prepared by reaction of an epoxystearic acid ester corresponding to the following formula

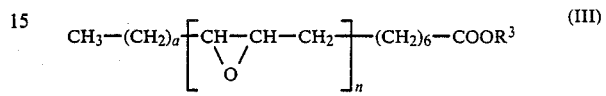

with a diamine or triamine corresponding to the following formula

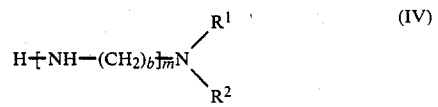

In formulae III and IV above, a, b, m, n, $R^1$ and $R^2$ have the same meanings as in formulae I and II. $R^3$ represents a $C_1$-$C_5$ alkyl radical, or the residue of a polyhydric $C_2$-$C_6$ alkyl radical, or the residue of a polyhydric $C_2$-$C_6$ alcohol, wherein the hydroxy groups are also esterified with an epoxyfatty acid ester and, optionally, also with a saturated or unsaturated fatty acid ester. The epoxystearic acid esters corresponding to formula III are reacted with at least $n+1$ moles of an amine corresponding to formula IV, optionally in the presence of a polar solvent, at a temperature of from 130° to 200° C. Volatile secondary products are separated off on completion of the reaction.

If an epoxystearic acid ester corresponding to formula III is reacted with an amine corresponding to formula IV in a solvent, a lower alcohol such as methanol, ethanol, isopropanol, and also ethylene glycol or glycerol is particularly suitable for this purpose. These alcohols may also be mixed with water. The addition of a catalytic quantity of an alkali metal such as sodium hydroxide, for example, is also advisable.

In the epoxystearic acid esters corresponding to formula III, the acid component may comprise epoxidized oleic acid, linoleic acid or linolenic acid, i.e., an epoxidized $C_{18}$ fatty acid. Depending on their origin, the afore-mentioned acids also contain fractions of unsaturated $C_{14}$, $C_{16}$, $C_{20}$ or $C_{22}$ fatty acids in small quantities of, in all, up to 25% by weight. By virtue of their ready availability, the epoxy esters corresponding to formula III which are derived from the oleic acid occurring in numerous natural fats are of particular practical importance as a starting material for the preparation of the compounds to be used in accordance with this invention.

The alcohol component of the compounds corresponding to formula III may comprise a lower aliphatic alcohol, such as methanol, ethanol, propanol, isopropanol, n-butanol and n-pentanol, or an aliphatic diol and polyol, such as for example, ethylene glycol, propylene glycol, 1,6-hexane diol and glycerol.

The epoxidized fatty acid ester of a monohydric $C_1$-$C_5$ alcohol, particularly the methyl ester, is preferably used as the ester of formula III for the preparation of the compounds to be used in accordance with this invention.

If the compounds of formula I to be used in accordance with this invention are prepared from an epoxidized ester of a polyhydric alcohol as a starting material, more especially from a triglyceride of the type obtainable from natural fatty acid sources, then glycerol or fatty acid partial glycerides may also be present in the reaction product without detriment to the advantageous effect of the process products. These fatty acid derivatives of saturated or unsaturated fatty acids accumulating as secondary products are of the type which generally contain from 10 to 22, and more especially, from 12 to 18 carbon atoms.

Accordingly, there is no need to use a pure oleic acid, linoleic acid and linolenic acid ester on which the epoxy compounds of formula III are based. Instead, it is possible to use as a starting material epoxidized fatty acid mixtures of the type obtained from natural vegetable and animal fats, such as for example olive oil, soya oil, rapeseed oil, cottonseed, oil, linseed oil, tallow, fish oils, tall oil, etc.

The amines corresponding to formula IV are aliphatic diamines and triamines, such as for example ethylenediamine, trimethylenediamine, tetramethylenediamine, pentamethylenediamine, hexamethylenediamine, diethylenetriamine and dipropylenetriamine, and asymmetrically substituted monoalkyl and dialkyl derivatives thereof, such as for example N,N-dimethylaminoethyl amine, N,N-dimethylaminopropyl amine or N-dodecylaminopropyl amine.

The products used in accordance with this invention include, for example, the reaction product of epoxystearic acid methyl ester with ethylenediamine, i.e. a mixture of the N-(2-aminoethyl)-amides of 9-(2-aminoethylamino)-10-hydroxystearic acid and 10-(2-aminoethylamino)-9-hydroxystearic acid, also the corresponding aminohydroxystearic acid amides prepared by reaction of this epoxy ester with trimethylenediamine, tetramethylenediamine, pentamethylenediamine, hexamethylenediamine, diethylenetriamine, N,N-dimethylethylenediamine, N,N-dimethylaminopropyl amine and N-dodecylaminopropyl amine. The products used in accordance with this invention also include the reaction product of epoxidized olive oil fatty acid methyl ester and trimethylenediamine; the reaction product of the epoxidized methyl ester of tall oil fatty acids with N,N-dimethyl ethylenediamine; the reaction product of a mixture of 50% by weight epoxidized tall oil fatty acid methyl ester and 50% by weight epoxidized soya fatty acid methyl ester with hexamethylenediamine; the reaction product of a mixture of 70% by weight epoxidized soya fatty acid methyl ester and 30% by weight epoxidized fish oil fatty acid methyl ester with dipropylenetriamine; and the reaction product of epoxidized olive oil with ethylenediamine.

The polyfunctional epoxide compounds which react with the crosslinking agents used in accordance with this invention to form high molecular weight compounds belong to various classes of compounds known generally as epoxy resins, including for example the epoxide compounds formed by epoxidation from a cycloaliphatic hydrocarbon or even triglycidyl isocyanurate and, in particular, the liquid to solid glycidyl ethers obtainable by reaction from a polyhydric phenol, for example diphenylolpropane, with epichlorohydrin. Epoxy resins are used as a basis for various applications and, in particular, as adhesives and coating compositions for various materials. They may be processed in the form of a lacquer solution or as a so-called powder lacquer. They are very widely used in particular for bonding metal surfaces and surfaces of glass, porcelain, ceramics, wood, thermoplastic resin, and thermosetting resin.

The epoxy resins are normally characterized by their epoxide number of their epoxide equivalent, and the aminohydroxystearic acid amides by their amine number or their amine equivalent. To obtain effective crosslinking in adhesives and coating compositions, the reactants are used in such a quantity that there are about 90 to 150 amine equivalents to 100 epoxide equivalents.

The reacting mixtures may be used as adhesives both for metallic surfaces and also for surfaces of glass, porcelain, ceramics, wood, and also thermoplastic resins and thermosetting resins. The mixtures have a pot life of from about 10 minutes to about 1-2 hours, depending on the ambient temperature and the size of the batch. The actual crosslinking reaction (hardening) may be effected at a temperature of from 5° C. to 120°-180° C. In accordance with generally known guidelines, the velocity of the crosslinking reaction depends on the temperature and on other additives, if any, in the mixture and may vary from a few minutes to a few days.

EXAMPLES (A) The basic procedure for preparing an aminohydroxystearic acid amide of this invention was as follows.

In a 6-liter stirring apparatus, 980.9 g (3.35 moles) of epoxystearic acid methyl ester (M 293, calc. from S.no. 191.5; Ep.no. 4.78) and 2636.7 g (20.1 moles) of dipropylenetriamine were heated under nitrogen with stirring to 200° C. The elimination of methanol began at 175° C. The methanol formed (114.4 g) was removed through a water separator. After the temperature of 200° C. had been reached, the reaction mixture was kept at that temperature for 4.5 hours. Excess dipropylenetriamine was then distilled off (12 to 0.7 mbar/200° C.). In all, 1951 g were recovered. A viscous yellowish liquid identified as reaction product I in the amount of 1552 g, having an epoxide number of 0.89 and an amine number of 360 was obtained.

An aminohydroxystearic acid amide identified as reaction product II having an amine number of 323 and an epoxide number of 0.37 was similarly obtained from epoxystearic acid methyl ester and diethylenetriamine.

(B) Metal-to-metal bonding evaluation was as follows.

A mixture of 80 parts by weight of a modified commercial diglycidyl ether of diphenylolpropane having an epoxide equivalent of 195, and 20 parts by weight of an unmodified diglycidyl ether of diphenylolpropane having an epoxide equivalent of 186 was used as the epoxy resin.

(1) Quantities of 10 parts by weight of reaction product I were homogeneously mixed with
  (a) 10 parts by weight of the foregoing epoxy resin mixture, and
  (b) 7.5 parts by weight of the foregoing epoxy resin mixture,
  respectively.

The pot life of the mixtures was 20 minutes. Sandblasted and degreased iron plates measuring $100 \times 25 \times 1$ mm were bonded with the mixtures with a 1 cm overlap and the shear strength of the bonds measured after various times in accordance with DIN 53 281/3. The tensile shear strength (N/mm²) is shown in Table 1 below in dependence upon the quantity of mixture and the storage time. The values are the average of 20 measurements.

TABLE 1

| Mixture | After 1 day at 22-23° C. N/mm² | After 7 days at 22-23° C. N/mm² | After 30 minutes at 80° C. + 24 hours at 22-23° C. N/mm² |
|---|---|---|---|
| (a) | 18-20 | 19-22 | 29-35 |
| (b) | 20-22 | 20-23 | 25-33 |

(2) Quantities of 10 parts by weight of reaction product II were homogeneously mixed with (a) 10 parts by weight of the foregoing epoxy resin mixture, and (b) 7.5 parts by weight of the foregoing epoxy resin mixture, respectively.

The pot life of the mixtures was 40 minutes. In the same way as above, iron plates were bonded and the tensile shear strength of the resulting bonds was determined in accordance with DIN 53 281/3. The tensile shear strength in N/mm² (average of 25 measurements) is shown in Table 2 below in dependence upon the quantity of mixture used and the storage time.

TABLE 2

| Mixture | After 1 day at 22-23° C. N/mm² | After 7 days at 22-23° C. N/mm² | After 30 minutes at 80° C. + 24 hours at 22-23° C. N/mm² |
|---|---|---|---|
| (a) | 7-9 | 10-13 | 25-33 |
| (b) | 10-15 | 15-25 | 20-33 |

We claim:

1. The process of providing an adhesive mixture for a surface of metal, glass, porcelain, ceramic, wood, thermoplastic resin or thermosetting resin, comprising mixing an aminohydroxy fatty acid amide with a polyfunctional epoxide compound, said aminohydroxy fatty acid amide corresponding to the formula

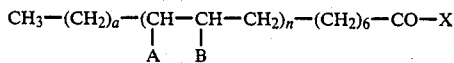

wherein $n=1$ and $a=7$, or $n=2$, and $a=4$, or $n=3$ and $a=1$, and one of the substituents A and B represents a hydroxyl group while the other substituent B or A and the substituent X represent a radical corresponding to the following formula

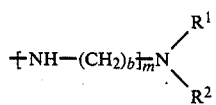

wherein b is an integer of from 2 to 6, $m=1$ or 2, and $R^1$ and $R_2$ independently of one another represent hydrogen or a $C_1$-$C_{12}$ alkyl radical.

2. The process as in claim 1 wherein said aminohydroxy fatty acid amide comprises aminohydroxy stearic acid amide.

3. The process as in claim 2 wherein said aminohydroxy stearic acid amide is employed as a crosslinking agent for said adhesive.

4. The process as in claim 2 wherein about 90 to about 150 amine equivalents of said aminohydroxy stearic acid amide is employed per 100 epoxide equivalents of said polyfunctional epoxide compound.

5. The process as in claim 1 wherein said aminohydroxy fatty acid comprises the reaction product of epoxystearic acid methyl ester with ethylenediamine.

6. The process as in claim 1 wherein said aminohydroxy fatty acid amide is obtained by condensing an epoxidized fatty acid alkyl ester with a polyfunctional aliphatic oligoamine.

7. The process of crosslinking a polyfunctional epoxide compound comprising combining said epoxide compound with an aminohydroxy fatty acid amide corresponding to the formula

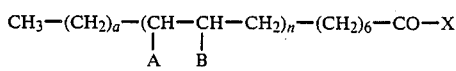

wherein $n=1$ and $a=7$, or $n=2$ and $a=4$, or $n=3$ and $a=1$, and one of the substituents A and B represents a hydroxyl group while the other substituent B or A and the substituent X represent a radical corresponding to the following formula

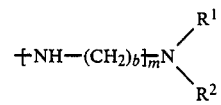

wherein b is an integer of from 2 to 6, $m=1$ or 2, and $R^1$ and $R^2$ independently of one another represent hydrogen or a $C_1$-$C_{12}$ alkyl radical.

8. The process as in claim 7 wherein said aminohydroxy fatty acid amide comprises aminohydroxy stearic acid amide.

9. The process as in claim 8 wherein said aminohydroxy stearic acid amide is employed as a crosslinking agent for an adhesive and/or coating composition comprising an epoxy resin.

10. The process as in claim 9 wherein about 90 to about 150 amine equivalents of said aminohydroxy stearic acid amide is employed per 100 epoxide equivalents of said epoxy resin.

11. The process as in claim 9 wherein said adhesive and/or coating composition is applied to the surface of metal, glass, porcelain, ceramic wood, thermoplastic resin, or thermosetting resin.

12. The process as in claim 7 wherein said aminohydroxy fatty acid amide comprises the reaction product of epoxystearic acid methyl ester with ethylenediamine.

* * * * *